July 12, 1949. H. FRIEDMAN 2,475,603
GEIGER COUNTER STRUCTURE
Filed March 5, 1946
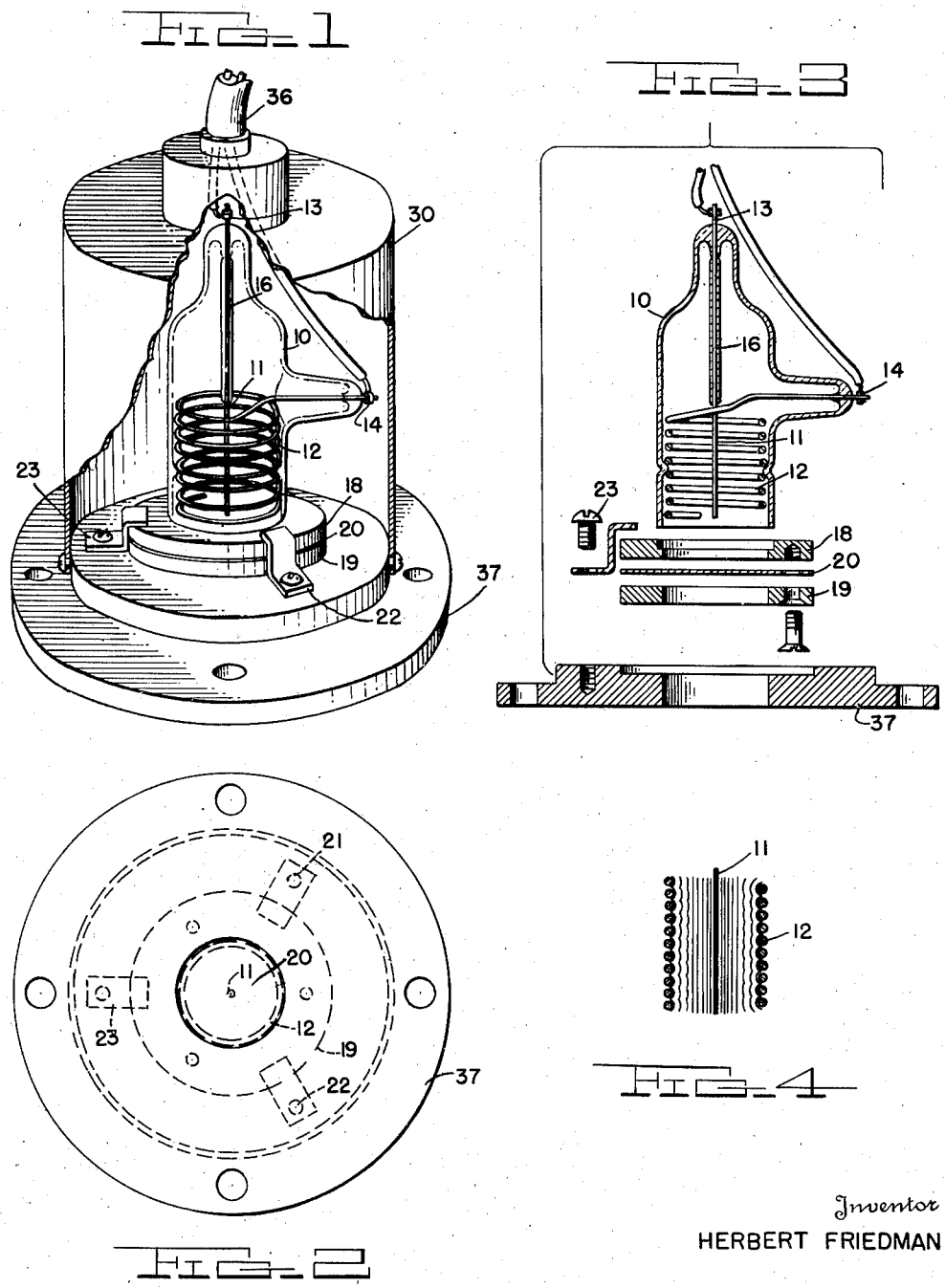
Inventor
HERBERT FRIEDMAN Patented July 12, 1949

2,475,603

UNITED STATES PATENT OFFICE 2,475,603

GEIGER COUNTER STRUCTURE

Herbert Friedman, Arlington, Va.

Application March 5, 1946, Serial No. 652,200

1 Claim. (Cl. 250—27.5)

(Granted under the act of March 3, 1883, as amended April 30, 1928; 370 O. G. 757)

This invention relates to radiation detecting and intensity measuring devices, and particularly it relates to a novel form of Geiger-Mueller counter adapted to the detection and measurement of the intensity of beta radiation, especially low intensity radiation.

The employment of Geiger-Mueller counters as radiation detecting and intensity measuring devices for such purposes as exploration for radioactive minerals, location of lost particles of radium in research institutions and hospitals, the study of nuclear reactions in the derivation of atomic energy, and in general the study and measurement of penetrating radiation of all sorts has become standard practice. The physical literature is rich with empirical descriptions of Geiger-Mueller counter structures to which various advantages are ascribed in various degrees. See, for example, the article entitled "Recent research on counter tubes" by J. D. Craggs in Reports on Progress in Physics, volume IX, pages 137–157, 1942–43.

In general, when the object of a measurement is either to detect and locate a source of weak radiation or to measure the intensity of an unknown source of weak radiation, it is essential that the detector tube be extremely sensitive to the individual quanta of radiation. Due to the weakness of the source, interference with the counting action of the tube will appear in the form of background counting to a sufficient degree to obscure the measurement. The background count normally occurring within a tube can be ascribed in part to cosmic radiation and to extraneous electrical effects in the atmosphere. Of greater importance, however are various stray electrical and physico-chemical effects produced by irregularities and abnormalities of the electrode surfaces within the tube itself. A tube structure can be fairly easily shielded from extraneous radiation. In general, therefore, the problem reduces to that of constructing a tube which will give a rapid response to radiations in the form of a relatively large number of counts above background to correspond to radiation of a given intensity. The actual number of counts above background is the measure of the intensity of the unknown radiation, but it is apparent that the lower the background count the more certain can be the determination of the intensity of the unknown source, especially if the source is so weak that it hardly gives a detectable count about the normal background noise.

A Geiger-Mueller counter tube may be made selectively sensitive to a particular radiation through the use of a gaseous filling which is ionized to its optimum extent by the particular radiation. Thus a counter tube may be so constructed that it is specifically affected by weak or relatively non-penetrating radiations, insofar as the particular gaseous filling may be one chosen to respond to these radiations. Should the Geiger-Mueller tube, however, have a large background count, the weak radiations will have little effect upon the already high count caused by background noise alone. This invention, by greatly decreasing the background noise of the Geiger-Mueller tube, therefore, makes practicable the use of tubes designed to respond to particular wavelengths of weak radiation.

Accordingly, it is a fundamental object of the invention to provide a Geiger-Mueller counter structure capable of detecting weak radiation by giving a characteristic response above a very low background count.

It is a second object of my invention to provide a Geiger-Mueller counter which not only has a low background count but can be made electrically sensitive to radiation of different wavelengths.

Other objects and advantages of my invention will in part be obvious and in part appear hereinafter.

Briefly, my invention comprises a Geiger-Mueller counter which departs from the conventional cylindrical cathode and coaxial anode wire in the provision of a cathode structure which bears the normal geometrical relationship to the anode wire but is of such construction that it maintains an electric field in the anode counting region of the proper strength, form, and concentration to provide for the counting action of the tube, and by the cathode structure reduces the background count of the tube practically to the vanishing point.

The nature, scope, and practice of my invention will be more readily understood by reference to the following specification and the accompanying drawings showing a tube constructed according to my invention in which:

Figure 1 is a perspective representation of a Geiger-Mueller counter tube made according to my invention and mounted within a shielded container with the shielded container partially broken away to show the connection of the tube thereto;

Figure 2 is a front end view of the counter tube constructed according to the invention;

Figure 3 is a longitudinal cross section of the tube exploded to show the arrangement of parts and the structure used for mounting the tube within its shield;

Figure 4 is a diagrammatic sketch showing the tube anode and cathode in cross section and a plot of the electric field within the tube to indicate the distribution of field intensity within the counting region of the tube.

Referring now generally to Figures 1, 2, and 3 which show a preferred form of the invention, 10 represents the envelope of the counter, 11 the axial anode and 12 the surrounding cathode. Electrical connections are made to the anode and cathode respectively by way of connecting wires 13 and 14 sealed through the tube envelope. Within the envelope, capillary insulator 16 covers the anode wire for a substantial portion of its length leaving there only a definite known length which is entirely surrounded by the volume circumscribed by the cathode.

For reasons which will appear subsequently, the envelope of the tube is mounted by cementing to the flanged window holder which comprises elements 18 and 19. Window 20 is soldered to one-half of the flange and closely gripped between the two elements of the flange by tightening screw members 21, 22, and 23. The window 20 must be made of a material which is capable of transmitting weak radiations without appreciable loss due to absorption. It may be made of beryllium or aluminum foil or of very thin glass.

When a beryllium window is to be used it can be readily soldered to the base metal comprising the flange by first copper-plating the portion of the beryllium to which the solder is to stick, heat treating the beryllium at an elevated temperature to bring about inter-diffusion of the copper and beryllium, and thereafter soldering the beryllium to the base metal by way of the copper-beryllium alloy surface. This process is described in greater detail in United States patent application 544,968 now abandoned filed July 14, 1944 by Herbert Friedman and Michael McKeown.

In order to shield the counter from extraneous radiation, that is radiation coming from directions other than those seen by the window, the entire structure is enclosed within a shield can 30 which can be provided with convenient handles for portable devices. Attachment is made to pulse counting and power supply circuits by way of cable 36. The entire assembly is supported on flanged base 37.

As can be seen in Figures 1, 2, and 3, the preferred form of cathode shown is an open helix, the degree of openness in the helix being governed by the number of turns needed to obtain a desired field strength for proper counting action in the neighborhood of the anode wire where the active counting of the tubes actually occurs.

In Figure 4, there is indicated a schematic representation of the field distribution within a tube having the form described in connection with Figures 1, 2, and 3. In the drawing the anode wire 11 is identifiable as is the cathode helix 12 which has been shown in section. The lines drawn approximately parallel to the anode wire represent equipotential lines which can be drawn through the field set up by the application of a voltage of the order of 1,000 volts across the anode and cathode when the configuration of the cathode has the form of the open helix shown in Figure 1.

The Geiger-Mueller counter tube constructed according to the principles described in this invention is, like other counters, susceptible to variations in its operation according to the nature of the gaseous filling used within the tube. The preferred form of gaseous filling to be used with a tube structure such as that described is the type of gas filling which will absorb all or a substantial portion of entrant radiation and will thereby initiate discharges in the tube by virtue of a photo-electric effect occurring within the gas. In filling a tube for such operation, it is generally necessary to select the gas according to the wavelength of radiation to be studied. The relationship between the gas to be used and the wavelength to be measured depends upon a critical absorption limit of the gas and is described more fully in United States Patent 2,386,785 issued October 16, 1945 to Herbert Friedman.

Through this modification of cathode structure, that is, the employment of an open helix of sufficient pitch to maintain the necessary field strength in the counting region of the tube near the anode, a series of novel effects is obtained, which include such a marked reduction of background noise that the Geiger-Mueller counter tube may be used for a wide range of applications which were hitherto impracticable. The degrees of openness of the helix should, as stated, be just sufficient to maintain a field of the proper counting strength in the counting region adjacent to the anode wire. Actually a helical cathode of a single loop would give a small counting region adjacent to the anode, but in general a plurality of loops would be preferred. For example a spacing between loops of at least one wire diameter should be used. In general the pitch of the helix most conveniently made and used will allow for spaces between loops of one or more wire diameters.

The tube, for example, may now be made sensitive to extremely weak radiations which formerly were indistinguishable from the background noise. It may further be modified by using the appropriate gaseous fillings so as to differentiate between types of "soft" radiations, and may therefore be applied to the problems of beta, gamma, and soft X-ray detection and to a large group of further practical uses, such as the measurement of radiations emitted by small amounts of weakly radioactive materials.

The invention described herein may be manufactured and used by or for the Government of the United States of America for governmental purposes without the payment of any royalties thereon or therefor.

Having described my invention, what I claim as new and desire to secure by Letters Patent of the United States is:

A Geiger-Mueller counter for the measurement of weak radiation comprising a radiation shielding enclosure having an aperture therein, a counter tube within the enclosure comprising a thin flat radiation transmitting window mounted adjacent the aperture, a gas tight envelope sealed to the window, a linear anode conductor within and carried by the envelope and directed toward the window, and a cathode within the envelope consisting of a cylindrical helix of wire of circular section, coaxial with the anode, the helix pitch being small and operative to establish a uniform counting field strength along the anode, and an ionizable gas filing in the envelope.

HERBERT FRIEDMAN.

REFERENCES CITED

The following references are of record in the file of this patent:

UNITED STATES PATENTS

| Number | Name | Date |
| --- | --- | --- |
| 2,197,453 | Hassler | Apr. 16, 1940 |
| 2,368,486 | Mullane | Jan. 30, 1945 |
| 2,383,478 | Friedman et al. | Aug. 28, 1945 |
| 2,397,071 | Hare | Mar. 19, 1946 |

FOREIGN PATENTS

| Number | Country | Date |
| --- | --- | --- |
| 87,583 | Austria | Mar. 10, 1922 |

OTHER REFERENCES

Locker and Weatherwax, Radiology, vol. 27, 1936, pp. 149–157, pp. 152 and 153.